United States Patent Office 3,485,784
Patented Dec. 23, 1969

3,485,784
MODIFIED WAX COMPOSITIONS
George E. Waples, Jr., Lake Jackson, Tex., assignor to The Dow Chemical Company, Midland, Mich., a corporation of Delaware
No Drawing. Filed May 14, 1962, Ser. No. 194,680
Int. Cl. C08h 9/10
U.S. Cl. 260—28.5        14 Claims This invention relates to improved wax compositions suitable for coating paper and other substrates and more particularly to wax compositions containing minor amounts of specially prepared ethylene copolymers.

The coating of paper and other substrates with wax for the purpose of obtaining a water and moisture-proof packaging material has been practiced for many years. These coated materials have long suffered from certain deficiencies among which are brittleness, low tensile strength and low elongation. Another difficulty with wax coatings is that their adhesion to paper and analogous substrates is very low and results in the wax peeling from the base material quite easily. These deficiencies have resulted in cracking and breaking of the wax coating with resultant leakage, and loss of protection against water, moisture, dust and foreign matter in general.

In attempting to overcome these shortcomings, various techniques have been tried including the addition of polymeric materials to the wax. These attempts have fallen short of a desirable product in that the resulting compositions did not have sufficient adhesion to substrates and exhibited phase separation on cooling. This phase separation is attributable to an incompatibility of the polymer with the wax and interferes substantially with the properties of the final product. Phase separation also causes difficulties in processing. Another deficiency found in mixtures of wax with some polymeric materials is that the melt viscosities become so high that their use would require costly modification of existing equipment and techniques for the application of wax coatings.

It is, therefore, an object of the present invention to provide a new wax composition. Another object of this invention is the provision of a wax composition having improved properties rendering it more suitable as a coating for various substrates. A further object of the present invention is the provision of a wax composition modified by minor amounts of polymeric material whereby a coatable wax blend is obtained having improved adhesion to paper and other surfaces to be coated. Still another object of this invention is the provision of a particular class of polymer-modified wax compositions which do not suffer from the shortcomings of pure wax or of other polymer-modified waxes.

In accordance with the present invention, the above and other objects and advantages are attained in a composition comprising wax and a minor amount of a copolymer of ethylene with a lower alkyl ester of an acrylic acid. By the term "an acrylic acid," as used throughout this specification, is meant an α-β monoethylenically unsaturated monocarboxylic acid having from 3 to 7 carbon atoms. Representative specific examples of such acids are acrylic acid, methacrylic acid, ethacrylic acid, crotonic acid, isocrotonic acid, tiglic acid, angelic acid and senecioic acid. Among these, acrylic acid itself ($CH_2$=$CH$—$COOH$) is preferred. As used herein, the expression "lower alkyl" means an alkyl group having from 1 to about 8 carbon atoms, for example, the methyl, ethyl, isopropyl, n-butyl and the 2-ethylhexyl groups. Representative specific examples illustrative of lower alkyl esters of an acrylic acid are methyl acrylate, ethyl acrylate, methyl methacrylate, ethyl methacrylate, methyl ethacrylate, ethyl ethacrylate, isopropyl crotonate, n-butyl tiglate and 2-ethylhexyl senecioate. Small amounts of copolymer ranging upward from as little as about 0.1 percent by weight produce improvement in the properties of the wax and quantities up to about 29 percent can be utilized effectively. Beyond the upper end of this range, the viscosities of mixtures of wax with the copolymer of ethylene with an alkyl ester of an acrylic acid become too great for machine coating purposes. Between about 2 percent and 25 percent by weight of the copolymer based on the combined weight of the copolymer and the wax can be made use of beneficially in present coating equipment. Waxes particularly improved by modification in accordance with this invention are mnieral waxes especially petroleum waxes whether of the paraffin or microcrystalline types or mixtures thereof. These waxes have melting points within the range of about 40° C. to about 90° C. and can contain small amounts of non-waxy material such as mineral oil up to about 10 percent by weight. However, it is preferred to employ petroleum waxes containing less than about 0.5 percent by weight of mineral oil.

The modifying ingredient which serves to improve the properties of wax coatings is a copolymer of ethylene with a lower alkyl ester of an acrylic acid. Of special advantage for use in compositions of the present invention are ethylene/alkyl acrylate copolymers made by the so-called high pressure polymerization process using the stirred autoclave type of reactor. More particularly, this advantageous polymerization process is carried out by copolymerizing a mixture of ethylene and an alkyl ester of an acrylic acid in a stirred autoclave at a temperature in the range of about 150° C. to 250° C. and at a pressure in the range of about 15,000 to 30,000 pounds per square inch in the presence of a suitable catalyst such as oxygen or an organic peroxide such as ditertiary butyl peroxide. By varying the ratios of the comonomers in the feed, selection of the catalyst and its concentration and the conditions of temperature and pressure, the monomer ratio in the polymer can be controlled. Those copolymers which are found suitable for wax modification in accordance with this invention are solid resinous copolymers of ethylene and an alkyl ester of an acrylic acid having at least 50 percent ethylene by weight in the copolymer molecule and up to 50 percent by weight of an alkyl ester as herein described.

The compositions herein disclosed can be obtained by blending the wax with the copolymer in any conventional manner as on an external mixer such as a roll mill or on an internal mixer such as a Banbury mixer or a screw extruder to obtain a smooth, homogeneous mixture. Alternatively, simple stirring equipment can be employed or the wax and the copolymer can be coprecipitated from a mutual solvent.

Throughout this specification, parts and percentages are parts and percentages by weight unless otherwise specified. The following examples are illustrative of the present invention but the invention is not limited to the details thereof.

EXAMPLE I

Into a stirred high pressure autoclave reactor a monomer stream comprised of 97.55 percent ethylene and 2.45 percent ethyl acrylate is introduced, along with a separate feed stream of a solution containing 20 percent lauryl peroxide, 40 percent benzene and 40 percent hexane. The reactor pressure is maintained at 20,000 pounds per square inch and sufficient lauryl peroxide solution is introduced automatically to maintain a constant reaction temperature of 215° C. A mixture of copolymer and unreacted monomers is continuously removed from the stirred autoclave and the copolymer is recovered from the mixture by flashing off the volatiles. This copolymer has an ethylene content of 80 percent and an ethyl acrylate content of 20 percent, a density of 0.927 gram per cubic centimeter and a melt index of 18. Three parts of this copolymer are placed in a Banbury mixer with 147 parts of petroleum wax having a melting point of 65° C., a melt viscosity at 105° C. of 22.4 centipoises and a gel temperature of 66° C. The materials are blended in the mixer for 15 minutes at a temperature of 150° C. The resulting composition has a melt viscosity at 105° C. of 31.6 centipoises and a gel temperature of 67° C.

Sheets of 35 pounds bleached kraft paper are coated with the modified wax composition obtained in Example I in a quantity sufficient to saturate the paper and produce a coating on each side of the paper having a thickness of 0.0003 inch. Two sheets thus coated are heat sealed by passing them through the nip of a pair of rollers maintained at a temperature of 108° C. and thereafter cooled by passing them between chill rolls maintained at a temperature of 43° C. In order to determine the seal strength for each specimen, a sample is obtained by taking a center cut about 1 inch wide. This sample is tested on a Tinius Olsen tester. Three specimens of each coated sample are pulled apart (180° pull) at a cross-head speed of 10 inches per minute. The force necessary to pull apart each sample is recorded automatically on a graph in grams per inch. The average value of the three runs is recorded as the seal strength. The above product is found to have a peel strength of 0.35 pound per inch of width. By way of contrast, heat sealed strips made substantially in accordance with the above method using unmodified microcrystalline wax having the characteristics of the wax used in Example I, have a peel strength of 0.03 pound per inch of width.

EXAMPLE II

In order to produce a copolymer having an ethylene content of 88 percent and an ethyl acrylate content of 12 percent, there is introduced into a stirred high pressure autoclave reactor, a monomer stream comprised of 98.654 percent ethylene and 1.346 percent ethyl acrylate. A separate feed stream of a solution containing 20 percent lauryl peroxide, 40 percent benzene and 40 percent hexane is introduced along with the monomer stream. The reactor pressure is maintained at a pressure of 20,000 pounds per square inch and sufficient lauryl peroxide catalyst solution is introduced automatically to maintain a constant reaction temperature of 230° C. while the stirrer in the autoclave is continuously rotated. A mixture of copolymer and unreacted monomers is continuously removed from the stirred autoclave and the copolymer is recovered from the mixture by flashing off the volatiles. The copolymer obtained has a density of 0.9246 gram per cubic centimeter and a melt index of 20.1. Three parts of this copolymer are placed in a Banbury mixer with 147 parts of petroleum wax having a melting point of 65° C., a melt viscosity at 105° C. of 22.4 centipoises and a gel temperature of 66° C. The materials are blended in the mixer for 12 minutes at a temperature of 150° C. The resulting composition has a melt viscosity at 105° C. of 32.4 centipoises and a gel temperature of 69° C. Sheets of 35 pound bleached kraft paper are coated with the compositions of this example in the manner described above and found to have a peel strength of 0.17 pound per inch of width.

EXAMPLE III

Materials of commercial grade are employed to produce a copolymer of 78 percent ethylene and 22 percent ethyl acrylate having a density of 0.9315 gram per cubic centimeter and a melt index of 1.73 by introducing into a stirred high pressure autoclave reactor, a monomer stream composed of 97.26 percent ethylene and 2.74 percent ethyl acrylate. Along with the monomer stream, a separate feed stream of a solution containing 20 percent lauryl peroxide, 40 percent benzene and 40 percent hexane is introduced. The reactor pressure was maintained at 25,000 pounds per square inch and sufficient lauryl peroxide solution is introduced automatically to maintain a constant reaction temperature of 200° C. while in the autoclave and the stirrer is continuously rotated. A mixture of copolymer and unpolymerized monomers is continuously removed from the stirred autoclave and the copolymer is recovered from the mixture by flashing off the volatiles. Six parts of this copolymer are placed in a Banbury mixer with 144 parts of petroleum wax having a melting point of 65° C., a melt viscosity at 105° C. of 22.4 centipoises and a gel temperature of 66° C. The materials are mixed in the Banbury mixer for 8 minutes at a temperature of 150° C. to obtain an intimate blend. The resulting composition has a melt viscosity at 105° C. of 39.2 centipoises and a gel temperature of 67° C. Tests run on kraft paper as described in connection with Example I show the composition of this example to have a peel strength of 0.25 pound per inch of width.

EXAMPLE IV

Fifteen parts of an ethylene/ethyl acrylate copolymer having the characteristics described in Example III and produced by the stirred autoclave technique essentially as described therein, are placed in a Banbury mixer with 135 parts of petroleum wax having a melting point of 65° C., a melt viscosity at 105° C. of 22.4 centipoises and a gel temperature of 66° C. The materials are blended in the mixer for 15 minutes at a temperature of 150° C. The resulting composition has a melt viscosity at 105° C. of 88 centipoises and a gel temperature of 67° C. This composition manifests a peel strength of 0.85 pound per inch of width when tested in the manner set forth in Example I.

EXAMPLE V

Four parts of a paraffin wax having a melting point of 65° C., a gel temperature of 66° C. and a melt viscosity at 138° C. of 18 centipoises is intimately blended with 96 parts of an ethylene/ethyl acrylate copolymer having the properties of the copolymer described in Example I and made in a stirred autoclave as described therein. The mixing of the materials is carried out substantially as in Example I. The resulting composition has a melt viscosity at 105° C. of 42 centipoises, a peel strength of 0.40 pound per inch of width and a gel temperature of 67° C. In contrast, the wax alone has a peel strength of 0.04 pound per inch of width.

EXAMPLE VI

The procedure of Example V is substantially repeated using the same materials. In this example, however, 90 parts of the wax are blended with 10 parts of the copolymer. This composition has a gel temperature of 68° C., a melt viscosity at 105° C. of 77 centipoises and a peel strength of 0.45 pound per inch of width.

EXAMPLE VII

Example V is repeated except that 30 parts of the copolymer are intimately blended with 70 parts of the wax to produce a composition having a peel strength of 0.90 pound per inch of width, a viscosity at 105° C. of 2,800 centipoises and a gel temperature of 71° C.

EXAMPLES VIII THROUGH XI

A copolymer containing 70 percent ethylene and 30 percent ethyl acrylate is prepared by continuously feeding to a stirred autoclave, a pressurized mixture consisting essentially of 95.885 percent ethylene and 4.115 percent ethyl acrylate. A solution containing 20 percent lauryl peroxide, 40 percent benzene and 40 percent hexane is introduced as a second stream. The reaction pressure is maintained at 23,000 pounds per square inch and sufficient lauryl peroxide solution is introduced automatically to maintain a constant reaction temperature of 210° C. in the stirred autoclave. A mixture of copolymer and unreacted monomer is continuously withdrawn from the autoclave and the copolymer is separated from the mixture by flashing the volatiles. The copolymer thus prepared has a melt index of 18 and a density of 0.932 gram per cubic centimeter. This copolymer is hot blended in varying proportions with wax having the characteristics given in Example V in the manner there employed. In the table below, the proportions of the materials used and the properties of the resulting compositions are tabulated.

TABLE

| Example | Wax (parts by wt.) | Copolymer (parts by wt.) | Gel temperature (° C.) | Melt viscosity at 105° C. (centipoises) | Peel strength (lb./in. width) |
|---|---|---|---|---|---|
| VIII | 98 | 2 | 66 | 29 | 0.10 |
| IX | 96 | 4 | 66 | 39 | 0.15 |
| X | 90 | 10 | 67 | 74 | 0.60 |
| XI | 70 | 30 | 69 | 560 | 0.80 |

In a manner similar to the foregoing examples, compositions can be made and used comprising wax and copolymers containing at least 50 weight percent ethylene with other lower alkyl esters of an acrylic acid in which the alkyl groups have from 1 to about 8 carbon atoms, for example, methyl acrylate, isopropyl tiglate, n-butyl angelate, 2-ethylhexyl isocrotonate and the like, in amounts within the ranges referred to herein.

The present modified wax compositions can be utilized effectively as coatings and as adhesives for a wide variety of substrates including kraft and other kinds of paper, cardboard, cellophane, plastic film such as polyethylene and saran film, textiles, sheet metal, metal foil such as aluminum foil, wood and ceramics.

If desired, small amounts of other modifying agents such as dyes, pigments, lubricants, resins and plasticizers can be added to the composition to obtain their usual effects.

That which is claimed is:

1. A composition of matter comprising about 70 to about 98 percent of a mineral wax having a melting point from about 40° to about 90° C. and about 2 to about 30 percent of a copolymer of ethylene and an alkyl ester of $\alpha,\beta$-monoethylenically unsaturated monocarboxylic acid, the alkyl group having from 1 to 8 carbon atoms and the acid having from 3 to 7 carbon atoms, said copolymer containing in the copolymer molecule 1 to 50 percent by weight of the specified alkyl ester.

2. A composition of matter according to claim 1 where the $\alpha,\beta$-monoethylenically unsaturated monocarboxylic acid is acrylic acid.

3. A composition of matter according to claim 2 wherein the copolymer contains from about 5 to about 35 percent of the alkyl ester of acrylic acid.

4. A composition of matter according to claim 3 wherein the copolymer contains from about 12 to about 30 percent by weight of the alkyl ester of acrylic acid.

5. A composition of matter according to claim 2 wherein the alkyl ester of acrylic acid is ethyl acrylate.

6. A composition of matter according to claim 5 wherein the copolymer contains from 5 to 35 percent by weight of ethyl acrylate.

7. A composition of matter according to claim 5 wherein the copolymer contains from 12 to 30 percent by weight of ethyl acrylate.

8. A coated article of manufacture comprising a substrate having a coating thereon of a mixture comprising about 70 to about 98 percent of a mineral wax having a melting point from about 40° to about 90° C. and from about 2 to about 30 percent of a copolymer of ethylene and an alkyl ester of an $\alpha,\beta$-monoethylenically unsaturated monocarboxylic acid, the alkyl group having from 1 to 8 carbon atoms and the acid having from 3 to 7 carbon atoms, said copolymer containing in the copolymer molecule 1 to 50 percent by weight of the specified alkyl ester.

9. A coated article of manufacture according to claim 8 in which the substrate is paper.

10. A coated article of manufacture according to claim 9 in which the substrate is kraft paper.

11. The coated article of manufacture according to claim 8 wherein the copolymer contains from about 70 to about 88 percent by weight ethylene and from about 12 to about 30 percent by weight ethyl acrylate.

12. A coated article of manufacture according to claim 11 in which the substrate is paper.

13. A coated article of manufacture according to claim 12 in which the substrate is kraft paper.

14. A coated article of manufacture according to claim 12 in which the substrate is cardboard.

References Cited

UNITED STATES PATENTS

| 2,406,039 | 8/1946 | Roedel | 260—28.5 |
| 2,638,459 | 5/1953 | Bowman et al. | 260—28.5 |
| 2,877,196 | 3/1959 | Reding | 260—28.5 |
| 2,953,541 | 9/1960 | Pecha et al. | 260—45.5 |
| 2,953,551 | 9/1960 | White | 260—86.7 |

ALLAN LIEBERMAN, Primary Examiner

U.S. Cl. X.R.

117—132, 138.8, 155, 158; 260—86.7

PO-1050
(5/69)

UNITED STATES PATENT OFFICE
CERTIFICATE OF CORRECTION

Patent No. 3,485,784            Dated Dec. 23, 1969

Inventor(s) George E. Waples, Jr.

It is certified that error appears in the above-identified patent and that said Letters Patent are hereby corrected as shown below:

In Col. 5, line 56, delete "3" and insert --1--. In Col. 6, after line 52, add --Horn, Acrylic Resins. Reinhold Publishing Corp. New York Chapter 8, page 137. 1960.--
Column 5, line 53 and column 6, line 1, "2", each occurrence, should read -- 1 --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents